United States Patent [19]

Sun et al.

[11] Patent Number: 4,591,940
[45] Date of Patent: May 27, 1986

[54] SIGNAL QUALITY MONITOR FOR PROTECTIVE RELAY SYSTEM

[75] Inventors: Shan C. Sun, Coral Springs, Fla.; James P. McGivern, Plum Boro, Pa.

[73] Assignee: Westinghouse Electric Corp., Pittsburgh, Pa.

[21] Appl. No.: 682,403

[22] Filed: Dec. 17, 1984

Related U.S. Application Data

[62] Division of Ser. No. 397,753, Jul. 13, 1982, Pat. No. 4,524,446.

[51] Int. Cl.$^4$ ............................................. H02H 3/00
[52] U.S. Cl. ...................................... 361/68; 361/78; 361/66; 455/135; 455/136
[58] Field of Search ............... 361/68, 66, 64, 67, 361/69, 110, 78; 371/15, 22; 370/13, 14, 17; 455/135, 136

[56] References Cited

U.S. PATENT DOCUMENTS

| | | | |
|---|---|---|---|
| 3,707,651 | 12/1972 | Lensner et al. | 361/68 X |
| 4,056,838 | 11/1977 | Leib | 361/68 |
| 4,071,873 | 1/1978 | Andow et al. | 361/68 X |

Primary Examiner—A. D. Pellinen
Assistant Examiner—T. DeBoer
Attorney, Agent, or Firm—W. E. Zitelli

[57] ABSTRACT

A signal quality monitor, and a protective relay system using the monitor, which utilizes both AC and DC signals from the receiver agc stage to monitor a plurality of different signal parameters. A signal responsive to the noise in the communication channel which transmits at least one of the protective relay signals used in a protective relay comparison function, is also used in the trip circuits of the associated circuit interrupter to continuously adapt or modify the trip level in response to channel noise.

18 Claims, 7 Drawing Figures

SIGNAL QUALITY MONITOR FOR PROTECTIVE RELAY SYSTEM

This is a division of application Ser. No. 06/397,753, filed 7-13-82, now U.S. Pat. No. 4,524,446.

BACKGROUND OF THE INVENTION

1. Field of the Invention

The invention relates in general to protective relay systems, and more specifically to new and improved signal quality monitoring apparatus useful for determining if a protective relay signal received over a communication channel is suitable for use.

2. Description of the Prior Art

Protective relay systems for protecting electrical power transmission lines must be reliable, operating correctly when needed, and avoiding unnecessary operation. When a protective relay decision function receives a protective relay signal, or signals, from a communication channel, it is of critical importance that the signal quality be of such a level that the desired line between dependability and security is maintained.

In general, communication channel problems can be classified as follows:

(1) Dead channel;
(2) Signal strength outside the normal limits due to malfunctions or improper calibration of channel equipment;
(3) Noisy channel due to failing equipment, signal mixups, EMI, and the like; and
(4) Invalid signals due to unannounced channel equipment servicing, testing and calibration.

It would thus be desirable to provide a new and improved signal quality monitor for communication signals, which reliably and economically monitors all important signal parameters, and provides a go, no-go type of response which indicates whether or not all monitored parameters meet the prescribed standards.

SUMMARY OF THE INVENTION

Briefly, the present invention relates to new and improved signal quality monitor apparatus useful in protective relay systems, which systematically monitors all of the important parameters of a communication signal using AC and DC signals from the automatic gain control stage of the communication receiver. The AC signal used is the signal which appears at the output of the automatic gain control (agc) amplifier stage, and the DC signal is the gain control voltage which is developed to control the gain of the agc amplifier. The AC signal is processed to develop a noise signal indicative of the channel noise, and its waveform is also squared and processed to determine if the signal frequency is within the proper range. The DC signal is processed to determine if its magnitude is within the proper range, and it is also compared with the noise signal to insure that the signal-to-noise ratio (S/N) exceeds a predetermined value. If all of the monitored parameters meet the required standards, the signal quality monitor provides an "enable" signal, which allows an associated protective relay system to function normally. If any monitored parameter is below standard, the signal quality monitor provides a "disable" signal, which disables at least those functions of the associated protective relay system which utilizes the monitored communication signal.

The noise signal developed for the S/N function is additionally utilized in the trip circuits of the circuit interrupter associated with the monitored protective relay function to modify the trip decision function which utilizes the monitored communication signal. There is a direct relationship between the noise in the communication channel and the noise in the demodulated signal used in the protective relay function. The demodulated noise ultimately shows up in the voltage signal sent to the protective relay trip circuits for comparison with a reference voltage. In accordance with the teachings of the present invention, the noise signal is effectively added to the reference voltage. This arrangement maintains the accuracy of the trip circuit, automatically adapting or modifying the sensitivity of the trip circuit function in direct response to the level of noise in the communication channel.

BRIEF DESCRIPTION OF THE DRAWINGS

The invention may be better understood, and further advantages and uses thereof more readily apparent, when considered in view of the following detail description of exemplary embodiments, taken with the accompanying drawings in which.

DESCRIPTION OF THE PREFERRED EMBODIMENTS

Figure 1:
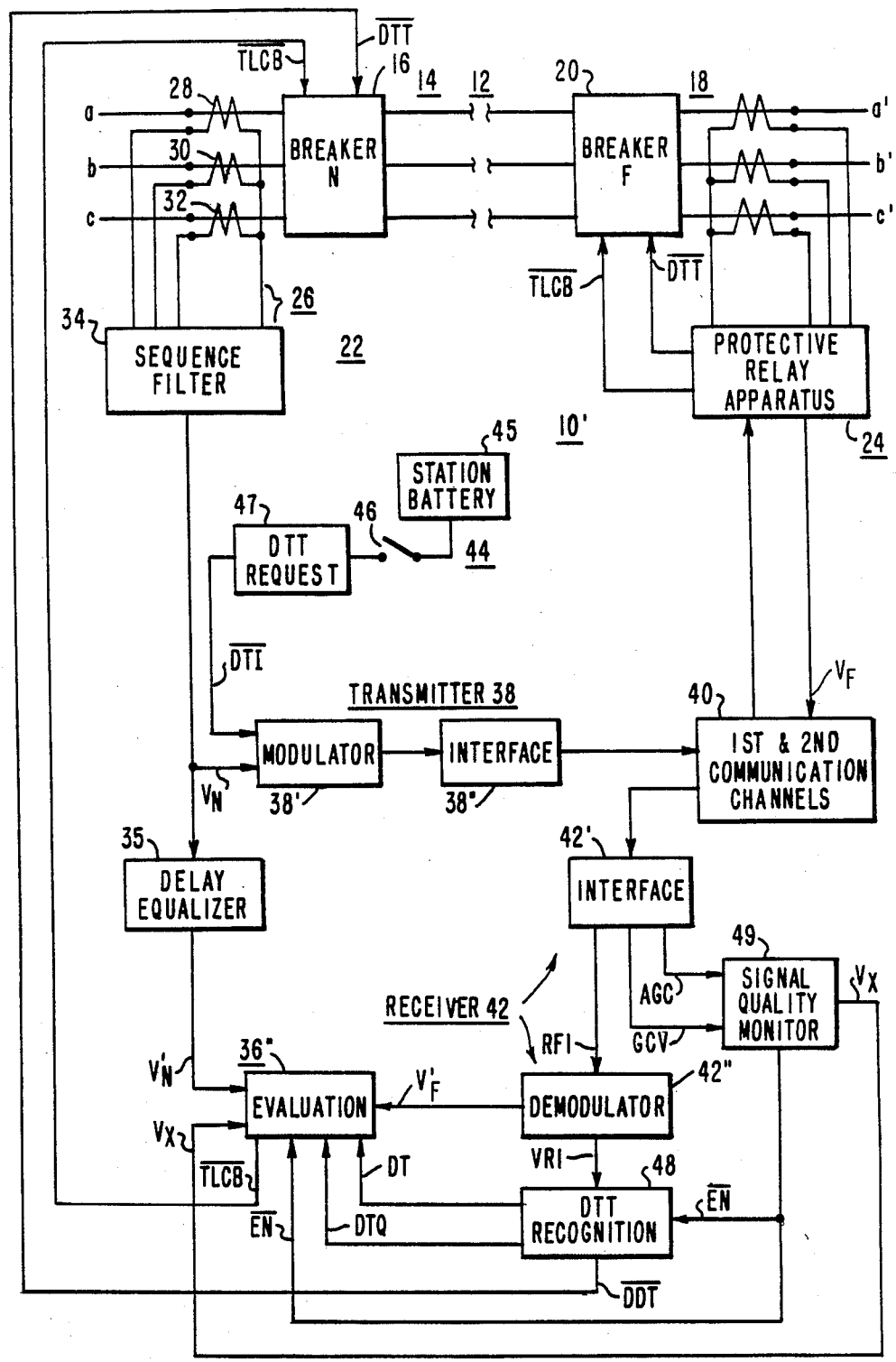
FIG. 1 is a schematic diagram of a protective relay system which may be constructed according to the teachings of the invention.

For purposes of example, the signal quality monitor of the invention will be applied to the protective relay system of U.S. Pat. No. 4,275,429, which is assigned to the same assignee as the present application. The relay system of this patent performs the functions of an electromechanical pilot-wire relay, without the necessity of having a continuous, metallic conductor connected between the points to be compared. Many different types of communication links may be used to send protective relay signals from one terminal to another terminal for comparison with the local protective relay signal, such as an optical link, microwave, power line carrier, or telephone channels. For purposes of example, the dedicated Bell Telephone System 3002 channel will be assumed to be the communication link. Certain co-pending applications assigned to the same assignee as the present application may also be referred to, if more information is desired relative to certain functions shown in the drawings. For example, co-pending application Ser. No. 339,031, filed Jan. 13, 1982, sets forth another embodiment of an evaluation function which may be used, instead of the one shown in U.S. Pat. No. 4,275,429. In like manner, Ser. No. 239,917, filed Mar. 3, 1981, discloses a pulse modulator which may be used in the transmitter of the protective relay system. Ser. No. 397,944, filed July 13, 1982 entitled "Demodulator", discloses a pulse demodulator which may be used in the receiver circuits of the protective relay system. Application Ser. No. 397,758, filed July 13, 1982 entitled "Protective Relay System", discloses a direct transfer trip (DTT) function, which may also be used in the protective relaying system of U.S. Pat. No. 4,275,429. Accordingly, U.S. Pat. No. 4,275,429, and the hereinbefore-mentioned patent applications, are all incorporated into the specification of the present application by reference.

Only the portions of the incorporated protective relay system which are necessary in order to understand the present invention are repeated herein. The reference numerals of the repeated portions have been retained in FIG. 1. Portions from the incorporated system which have been modified in FIG. 1 are identified with their prior reference numerals plus a prime (') mark.

Referring now to the drawings, and to FIG. 1 in particular, there is shown a new and improved protective relay system 10' for providing pilot protection for a transmission line section 12. The protected section 12 may be a two or a three terminal line, with a two terminal line being shown for purposes of example. Transmission line section 12 includes a local or near terminal 14, which includes a circuit breaker 16. Circuit breaker 16 interconnects one end of line section 12 with a high-voltage, three-phase AC electrical power system having conductors a, b and c. Transmission line section 12 further includes a first remote or far terminal 18 which includes a circuit breaker 20. Circuit breaker 20 interconnects another end of line section 12 with a high-voltage, three-phase AC electrical power system having conductors a', b' and c'.

Terminals 14 and 18 additionally include similar protective relaying apparatus 22 and 24, respectively. Since the protective relaying apparatus 22 and 24 at each terminal may be similar, only the protective relaying apparatus 22 associated with the near terminal 14 will be described in detail.

Protective relaying apparatus 22 includes means 26 for obtaining a protective relay signal, such as a current derived single-phase composite sequence voltage signal $V_N$ responsive to the three-phase currents flowing in conductors a, b and c, and the $3I_O$ or ground current. Means 26 includes current transformers 28, 30 and 32, and a composite sequence filter 34 which mixes predetermined percentages of positive, negative and/or zero sequence currents from the three phases to obtain a power frequency, e.g., 60 Hz, single-phase composite sequence voltage whose phase is responsive to the direction of power flow, and whose magnitude is responsive to the current magnitudes in the three phases. The same composite sequence filter now used by the prior art electromechanical pilot-wire relays may be used, with U.S. Pat. No. 2,183,646 describing a composite sequence filter which may be used; or the composite sequence filters may be solid state, constructed of operational amplifiers.

The current derived composite sequence signal or voltage $V_N$ is applied to a transmitter 38. Transmitter 38 includes a modulator 38' and a communication interface 38" for the type of communication link utilized. The waveform of voltage signal $V_N$ is used as the modulating waveform in modulator 38' for the type of communication selected for transmitter 38. For example, transmitter 38 may produce pulses at a predetermined nominal rate in response to a modulating signal of zero magnitude, with the pulse rate changing as signal $V_N$ changes from zero. Pulse period modulation is the preferred form of communication in the present invention, and the invention is accordingly described relative to this form of modulation. The center or nominal frequency may be chosen for the specific type of communication link 40 employed. Since the attenuation and envelope delay versus frequency will be known for the specific communication channel selected, the nominal pulse rate should be selected to minimize both attenuation and envelope delay. For example, in a dedicated Bell Telephone System 3002 channel, a narrow band of approximately ±300 Hz around a center frequency of approximately 1.7 KHz provides minimum attenuation and envelope delay. As hereinafter stated, the present invention will be described assuming the use of the 3002 channel in the communication link 40.

Protective relaying apparatus 22 also includes a receiver 42 connected to the communication link 40, which includes an interface 42' for the specific type of communication link 40 utilized, and a demodulator 42". Demodulator 42" may be the PPM demodulator of the hereinbefore-mentioned incorporated application. Receiver 42 receives a communication signal responsive to the power frequency, current derived, single-phase composite sequence voltage signal $V_F$ from the far terminal 18. Receiver 42 demodulates the communication signal to provide signal $V'_F$, which is similar to signal $V_F$, except delayed by the channel delay time.

Signal $V_N$ from sequence filter 34 is also applied to a delay equalizer 35, which provides a signal $V'_N$ which is similar to signal $V_N$, except delayed by the same time as the channel delay. Signals $V'_N$ and $V'_F$ are now in suitable form for direct comparison, and they are applied to an evaluation circuit for this purpose.

For normal through current, i.e., no fault in the protected transmission line section 12, and using the ct connections shown in FIG. 1, signal $V'_N$ will, ideally, be 180° out of phase with signal $V'_F$. When a fault occurs in the protected line section 12, current flow will be into the polarity marked terminals of the ct's and signals $V'_N$ and $V'_F$ will, ideally, be in phase.

The evaluation circuit, and its counterpart in protective relay apparatus 24, compare the single-phase voltage waveforms of the current derived signals $V'_N$ and $V'_F$, and if a fault is detected within the protected line section 12, trip signals $\overline{TLCB}$ are applied to their associated circuit breakers 16 and 18 to clear the transmission line section 12.

A direct transfer trip reagent for tripping circuit breaker 20 is initiated at the near terminal 14 by means 44 which includes a source 45 of electrical potential, such as the station battery, a contact 46, and a DTT request function 47. Contact 46 may be manually actuated, or it may be under automatic control via an appropriate protective relay circuit.

DTT request means, similar to means 44, is provided at the remote terminal 18. When this remote request means enters a DTT request to direct the tripping of circuit breaker 16, the request is recognized by a DTT recognition function 48. When function 48 detects a DTT request signal it provides signals DT and DTQ which modify the operation of the evaluation circuit 36". When means 44 initiates a DTT request signal, DTT recognition means located at the remote terminal 18, which is similar to means 48, processes the request.

The DTT functions shown in block form in FIG. 1 are described in detail in a hereinbefore-mentioned incorporated patent application.

A signal quality monitor function 49, constructed according to the teachings of the invention, monitors the incoming communication signal from the other terminal, or terminals, to determine if the signal quality is sufficiently good in order to enable the local-remote comparison function, and the DTT function.

Figure 2:
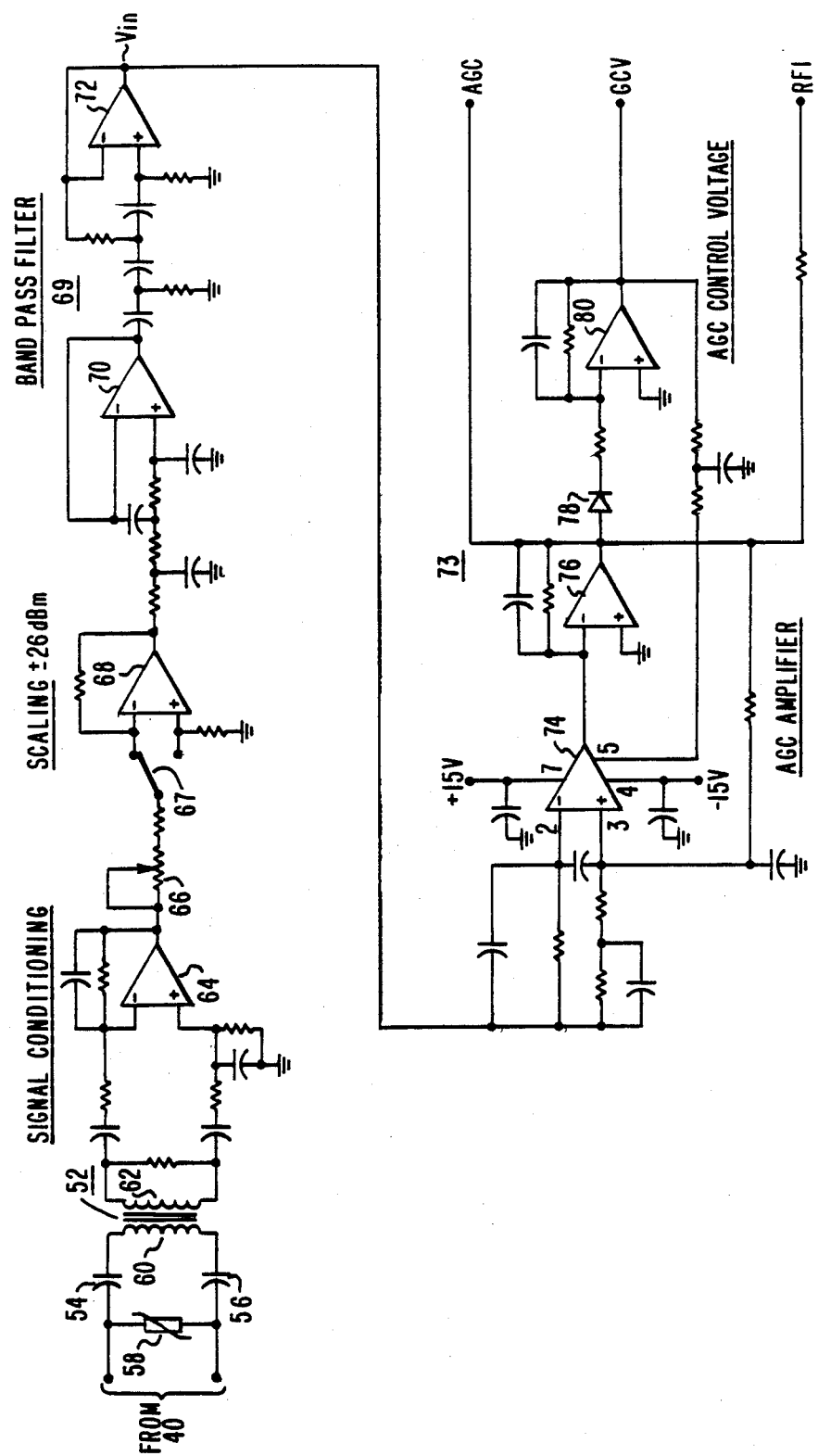
FIG. 2 is a schematic diagram of a receiver constructed according to the teachings of the invention.

While the signal quality monitor 49 is shown as an individual block in FIG. 1, it utilizes signals developed in the communication or receiver interface 42', and thus the development of these signals is shown in detail in FIG. 2.

FIG. 2 is a schematic diagram of a circuit which may be used for the communication interface 42' shown in FIG. 1. As hereinbefore stated, the communication channel 40 is assumed to be a telephone channel. The input and output impedances are commonly matched to 600 ohms, with the 0 dBm reference, used relative to audio power, corresponding to a 1 milliwatt power level across 600 ohms.

More specifically, the signal received from communication channel 40, which will have a frequency of 1.7 KHz±200 Hz, when modulated with the 60 Hz protective relay signal $V_F$, or 1.7 KHz±220 Hz, when modulated with the 400 Hz DTT command modulating signal, respectively, is applied to a 1:1 telephone interface transformer 52 via AC coupling capacitors 54 and 56. Transformer 52 includes primary and secondary windings 60 and 62, with a varistor 58 being connected across the primary winding 60, to protect against voltage spikes. The signal at the output of the secondary winding 62 is applied to an operational amplifier (op amp) 64 connected for common mode rejection, to further condition the communication signal.

The conditioned signal is then applied to a scaling stage, which includes an adjustable resistor or potentiometer 66, a switch 67, and an op amp 68 connected as an amplifier. Connecting the conditioned signal to the inverting input of op amp 68, via switch 67, provides up to 26 dB amplification, while connecting the signal to the non-inverting input provides up to 26 dB attenuation. The conditioned and scaled signal is then applied to a 1 KHz-2.5 KHz band pass filter 69, which may have a first stage having an op amp 70 connected as a low pass filter, which provides the 2.5 KHz limit, and a second stage having an op amp 72 connected as a high pass filter, which provides the 1 KHz limit.

The band passed signal, referred to as signal $V_{in}$, is then applied to an automatic gain control (agc) function 73. The agc function 73 includes an agc amplifier having a current controlled, variable gain amplifier. The amplifier, for example, may be a transconductance operational amplifier 74, such as RCA's 3080, and an op amp 76 connected to amplify the output of the transductance operational amplifier 74.

Transconductance operational amplifier 74 includes a gain control input (terminal 5) which controls the gain of the amplifier. A gain control voltage of zero volts provides maximum gain, with the gain decreasing as the control voltage becomes more negative.

Figure 5:
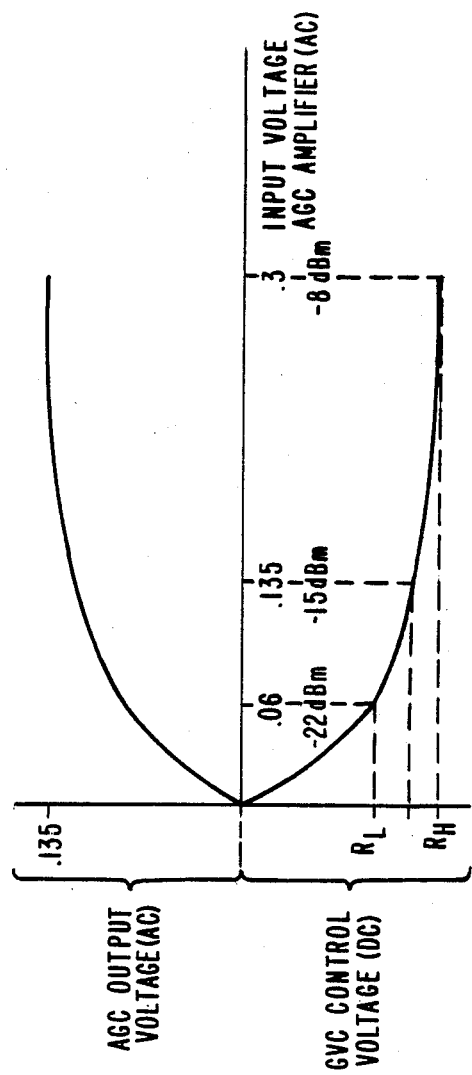
FIG. 5 is a graph which includes the agc transfer characteristic, and which illustrates preselected relationships which are established between the agc signal and the gain control voltage for the agc amplifier.

The gain controlled signal, which is an AC signal referenced AGC, is available at the output of op amp 76. The gain control voltage, which is a unidirectional voltage, is referenced GCV. Voltage GCV is developed from signal AGC via an absolute value circuit, which may include a rectifier 78 and an operational amplifier 80 connected as a low pass filter. When there is no signal at the output of op amp 76, the control voltage GCV is zero. As signal AGC increases, control voltage GCV becomes more negative, reducing the gain of amplifier 74. FIG. 5 is a graph which illustrates the development of the gain control voltage GCV. The AGC output voltage versus the AGC input voltage curve is deliberately forced to increase substantially linearly across the range of interest, to provide a change in the control voltage to be obtained which is suitable for controlling the amplifier gain. Thus, the output of the AGC amplifier is said to be substantially constant, instead of constant. Both the AC signal AGC, and the undirectional control voltage, GCV are uniquely utilized by the signal quality monitor 49, as will be hereinafter described.

Figure 3:
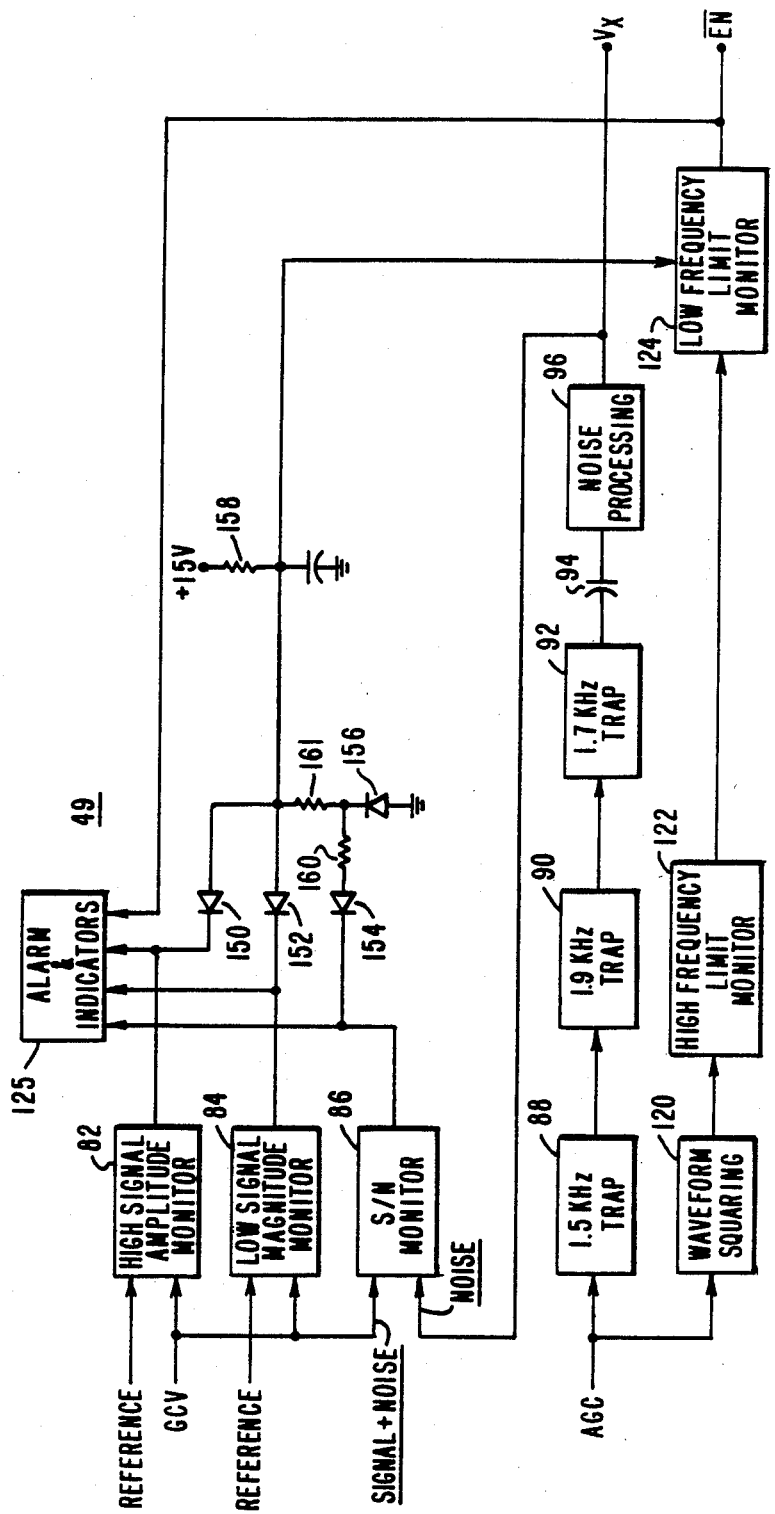
FIG. 3 is a partially block and partially schematic diagram of a signal quality monitor constructed according to the teachings of the invention.
Figure 4:
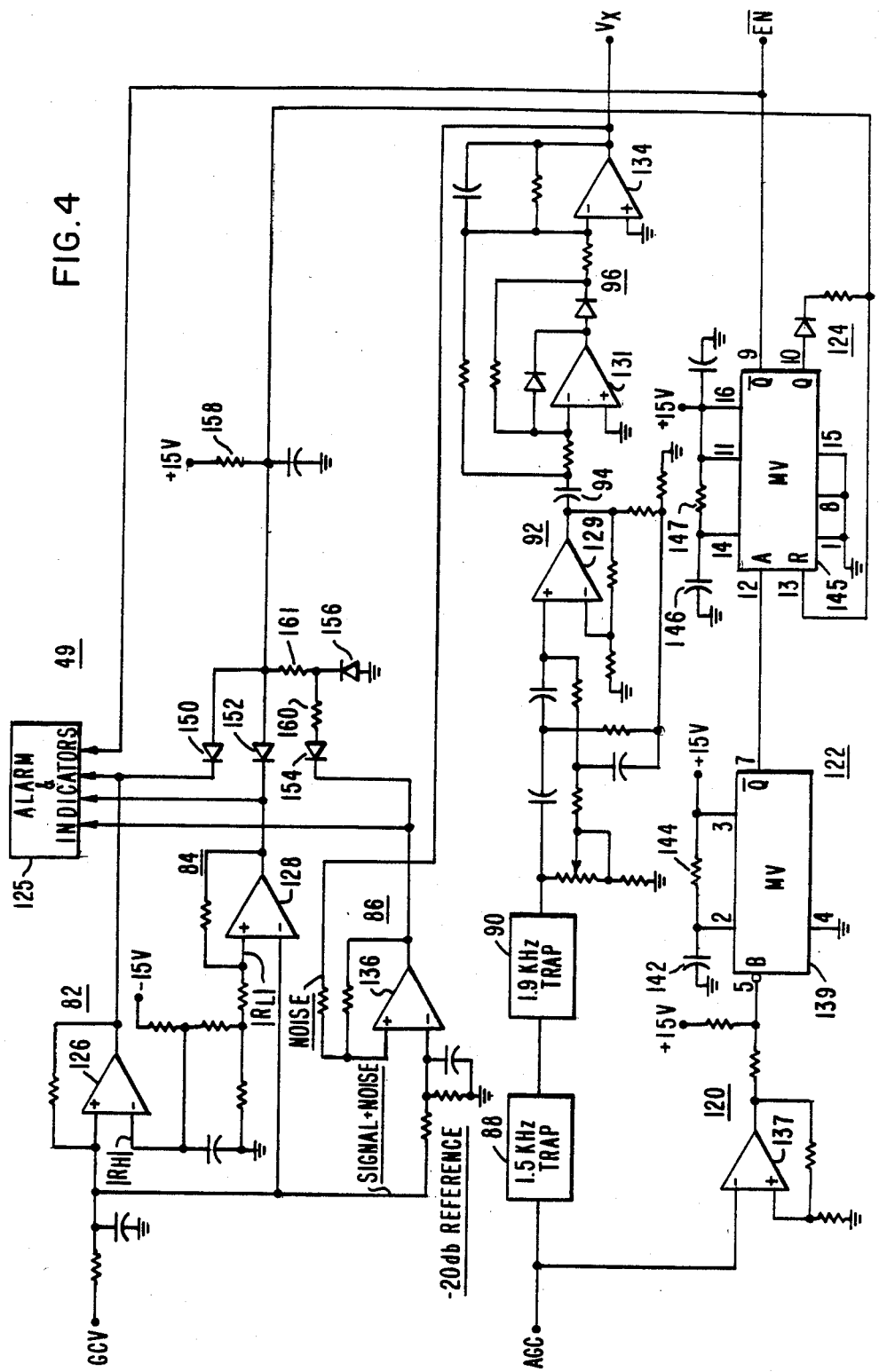
FIG. 4 is a detailed schematic of the signal quality monitor shown in FIG. 3.

FIGS. 3 and 4 set forth a signal quality monitor which may be used for the monitor 49 shown in block form in FIG. 1, with FIG. 3 being a partially schematic and partially block diagram, in order to clearly identify the various functions. FIG. 4 is a more detailed schematic of the circuit portions shown in block functional form in FIG. 3.

More specifically, control voltage GCV, which is a direct, unidirectional indication of signal strength, is monitored to insure that the signal magnitude is within the desired limits. High and low magnitude monitoring functions 82 and 84 compare voltage GCV with appropriate references to implement the magnitude monitoring functions.

Figure 6:
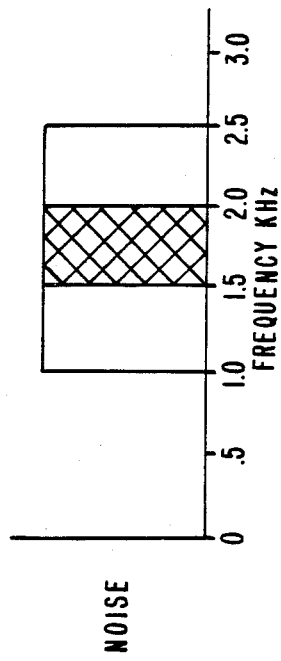
FIG. 6 is a graph which illustrates a step in the development of the noise signal in FIGS. 3 and 4.

A signal-to-noise ratio (S/N) monitor 86 compares control voltage GCV, which is representative of the desired signal plus channel noise, with a signal $V_X$ developed from signal AGC. Channel noise is substantially constant across the frequency range of the band passed signal, as shown in FIG. 6. Thus, a signal proportional to noise in the frequency range of the signal, i.e., 1.7 KHz±220 KHz, may be obtained by developing a signal proportional to the channel noise output in the band-passed frequency range. Any frequency band in the band-passed signal, outside the communication signal band, which will provide a signal of usable magnitude may be selected. As illustrated in FIG. 3, the signal AGC is successively subjected to 1.5 KHz, 1.9 KHz and 1.7 KHz traps, referenced 88, 90 and 92, respectively. Any DC level in the signal is removed with a capacitor 94, and the resulting signal, which, as shown in FIG. 6, includes the frequency ranges of about 1 to 1.5 KHz and about 2 to 2.5 KHz, is processed in function 96 to provide a unidirectional signal $V_X$, whose magnitude represents the noise portion of the signal received from the communication channel 40.

The waveform of signal AGC is squared in block function 120 and used to determine if the signal frequency is in the proper range via high and low frequency monitoring functions 122 and 124, respectively. If all of the monitored parameters of the signal, i.e., magnitude, S/N, and frequency are within acceptable limits, function 49 provides a signal $\overline{EN}$ at the low or logic zero level, which at this level is an enabling signal. If any one of the monitored parameters is outside its prescribed acceptable range or limit, signal $\overline{EN}$ will go high or to a logic one, which at this level is a disabling signal, as will be hereinafter explained. Suitable alarms and/or indicators, shown generally at 125, may be included to latch in and thus identify which parameter has triggered the signal quality monitor.

Referring now to the detailed embodiment of the signal quality monitor 49 shown in FIG. 4, the high magnitude monitor may be provided by an op amp 126 connected as a comparator, with the control voltage GCV being connected to its non-inverting input, and a suitable, relatively high, negative reference voltage is connected to its inverting input. If voltage GCV becomes more negative than the reference, it indicates that the signal has exceeded the upper magnitude limit, and the output of op amp 126 will switch from a logic one to a logic zero, as a result of this inverting input becoming more positive than the non-inverting input.

In like manner, the low magnitude monitor 84 may be provided by an op amp 128 connected as a comparator, with the negative control voltage GCV being connected to its inverting input, and a suitable, relatively low, negative reference voltage is connected to its non-inverting input. If voltage GCV becomes less negative than the reference, it indicates that the magnitude of the communication signal has dropped below the lower magnitude limit, and the output of op amp 128 will switch from a logic one to a logic zero, as a result of its inverting input becoming more positive than the non-inverting input.

Signal $V_X$, which is proportional to noise in the communication channel, is produced by a signal voltage stripping circuit which includes the three traps 88, 90 and 92, with only trap 92 being shown in detail, since they are of similar construction. Trap 92 may include an op amp 129 connected as an active twin T band reject filter, to block signals having a frequency of 1.7 KHz, and those immediately adjacent thereto, while passing signals above and below this small frequency band. Connecting the three traps in series provides a signal at the output of op amp 129 similar to that shown in FIG. 6. The noise processing function 96 may include op amps 132 and 134, with op amp 131 being connected as a precision rectifier, and op amp 134 connected as a summing amplifier. Op amps 131 and 134 provide a full-wave rectification of the signal applied thereto, with the output signal $V_X$ of op amp 134 being negative.

Signal $V_X$, which represents the magnitude of the channel noise, and the voltage GCV, which represents the useful signal plus channel noise, are applied to S/N monitor 86. S/N monitor 86 may include an op amp 136 connected as a comparator, with the resistive and capacitive reference components being selected to provide about a −20 dB reference, i.e., as long as the noise signal $V_X$ is less than 1/10th the signal plus noise, represented by voltage GCV, the output of op amp 136 will be high. If the noise signal $V_X$ becomes a greater percentage than 10 percent of the total signal, the inverting input will become more positive than the non-inverting input, and the output of op amp 136 will switch to a logic zero level.

The effectiveness of the S/N monitor 86 may be readily observed from the following relationships, where:

$V_{in}$ = The AC voltage applied to the agc function;
$f(V_{in})$ = The transfer characteristic of the agc function;
GCV = The agc control voltage (DC);
AGC = The AC output voltage from the agc function;
$|V_{in}|$ = The absolute value of the voltage $V_{in}$;
K1 = A constant (unitless);
K2 = A constant (unit of 1/volt); and
K3 = The reference in the S/N monitor The agc function implements the following relationship:

$$AGC = f(V_{in})V_{in} \quad (1)$$

The transfer function $f(V_{in})$ may be written:

$$f(V_{in}) = \frac{K1}{1 + K2|V_{in}|} \quad (2)$$

Thus, equation (1) may be written:

$$AGC = \frac{K1 V_{in}}{1 + K2|V_{in}|} \quad (3)$$

The input signal $V_{in}$ includes a signal voltage $V_{si}$ and a wide-band noise voltage $V_{ni}$, and thus $V_{in}$ may be written:

$$V_{in} = V_{si} + V_{ni} \quad (4)$$

Thus, equation (3) may be written:

$$AGC = \frac{K1(V_{si} + V_{ni})}{1 + K2|V_{si} + V_{ni}|} \quad (5)$$

The control voltage GCV may thus be written:

$$GCV = \frac{K1|V_{si} + V_{ni}|}{1 + K2|V_{si} + V_{ni}|} \quad (6)$$

After signal stripping, the resultant noise signal $V_x$ is thus:

$$V_x = \frac{K1|V_{ni}|}{1 + K2|V_{si} + V_{ni}|} \quad (7)$$

The signal to noise comparator 136 looks for the relationship:

$$K3|GCV| = V_x \quad (8)$$

Substituting equations (6) and (7) into (8) provides:

$$\frac{|V_{si} + V_{ni}|}{|V_{ni}|} = \frac{K1}{K3} \quad (9)$$

Since $V_{si}$ is many times greater than $V_{ni}$:

$$\frac{|V_{si} + V_{ni}|}{|V_{ni}|} \approx \frac{|V_{si}|}{|V_{ni}|} = \frac{K1}{K3} \quad (10)$$

Equation (10) indicates that S/N monitoring may be readily accomplished by choosing the reference K3 for the desired S/N ratio. It is also evident that the S/N function is relative, i.e., it is not tied to any specific magnitude of $V_{in}$.

The frequency monitoring function provides carrier frequency verification by inspecting every carrier frequency cycle. If the incoming signal is outside the allowed frequency deviation, a flag is raised similar to the high/low signal and S/N detections to signal the protective relay circuit for appropriate action. Unlike the other two detections (high/low and S/N), this detection is fast responding. Any incorrect frequency cycle, upon detection, results in the immediate sending of an appropriate logic signal. The high/low signal and S/N detections have built-in time delays due to the absolute value signal processing. All three detections ultimately merge into one logic output to go to the protective relay circuit. However, separate alarm indications are provided for identifying the nature of a channel problem.

More specifically, alternating signal AGC is squared in waveform squaring function 120, which may include an op amp 137 connected as a threshold squarer, and the output of the waveform squaring function 120 is applied to a high frequency monitoring function 122. The high frequency monitoring function may be performed by a multivibrator (MV) 139. MV 139, for example, may be one of the retriggerable, monostable multivibrators in Motorola's dual package MC14538B. Capacitor 142 and resistor 144 are selected such that the $\overline{Q}$ output of MV 140 will provide a pulse train, until the high frequency limit is reached, at which time the $\overline{Q}$ output will be continuously low, or a logic zero.

The low frequency monitoring function 124 may be provided by MV 145, which may be the other multivibrator in the hereinbefore-mentioned dual package, with MV 144 being connected to be responsive to the $\overline{Q}$ output of MV 139. Capacitor 146 and resistor 147 are selected such that if the $\overline{Q}$ output of MV 139 is providing a pulse train having a repetition rate which indicates signal AGC has a frequency above the lower limit, then the $\overline{Q}$ output of MV 145 will be continuously held low, providing a true or low enabling signal $\overline{EN}$. Should the pulse rate, and thus the signal frequency, fall below the lower limit, the $\overline{Q}$ output of MV 145 will provide a pulse train, which functions as a disabling signal, in the same manner as a continuously high signal would.

If the communication signal fails to pass the high frequency test provided by function 122, the $\overline{Q}$ output of MV 139 will be low, instead of a pulse train, and the $\overline{Q}$ output of MV 145 will be high, which also functions as a disabling signal.

The magnitude and S/N tests are applied to an appropriate logic function. For example, they may be OR'ed via diodes 150, 152, 154 and 156, resistors 158, 160 and 161, and a positive source of unidirectional potential. The output of the OR function is applied to the reset input R of MV 145. Should any of the OR'ed functions go low, to signify an out-of-limit parameter, the $\overline{Q}$ output of MV 145 will be forced high, which is the disabling level for signal $\overline{EN}$.

Figure 7:
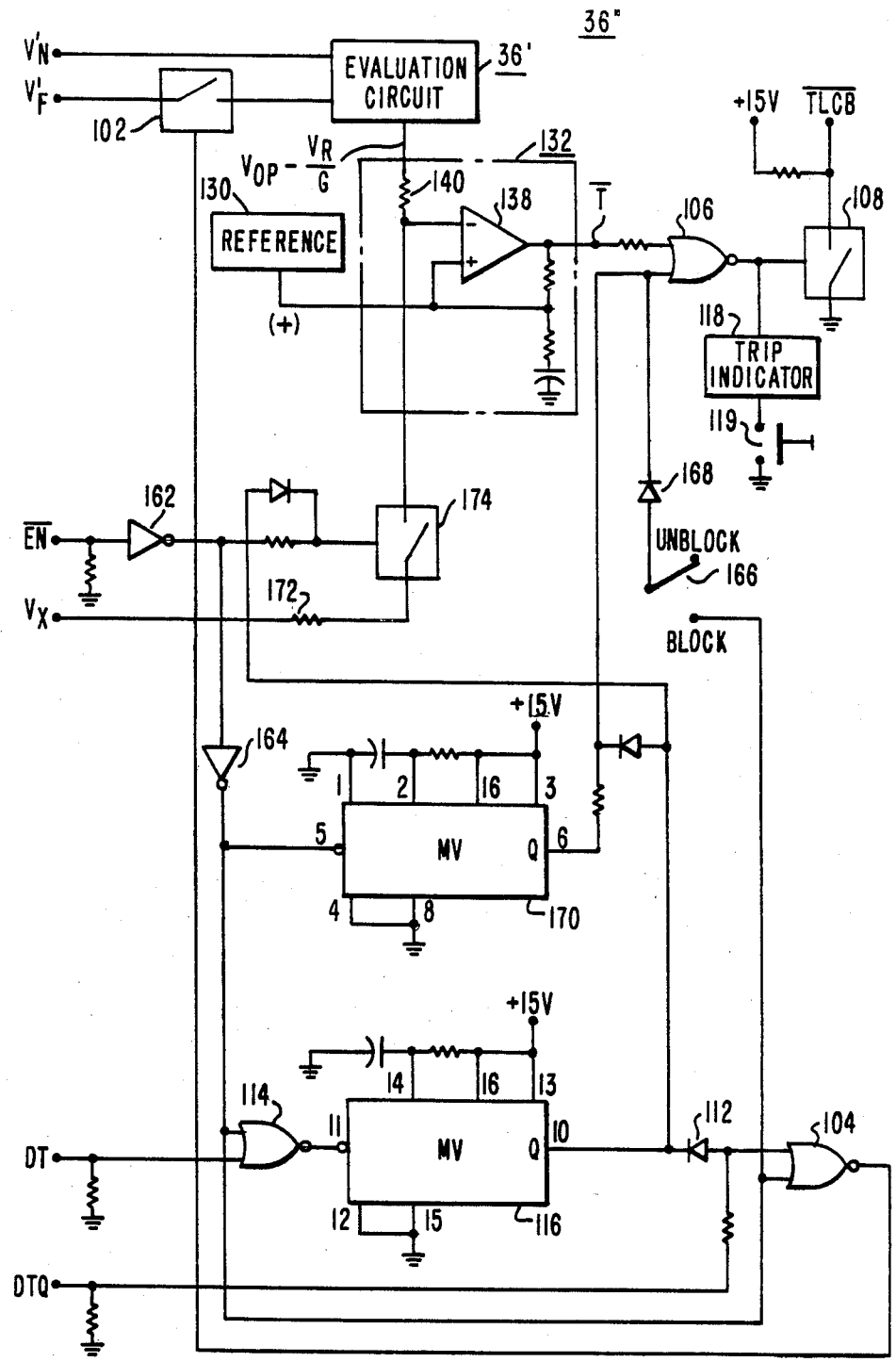
FIG. 7 is a schematic diagram of the evaluation function shown in block form in FIG. 1, which illustrates an application of the signal quality monitor signal to a protective relay system.

FIG. 7 is a schematic diagram which illustrates how the evaluation circuit 36'' may be made responsive to the enable/disable signal $\overline{EN}$ and also how the trip circuit may be made adaptive by the noise signal $V_X$. Certain of the components in FIG. 7 were first introduced in the co-pending incorporated application related to the DTT function, and they are retained in order to illustrate how the DTT function and signal quality monitoring functions may both be easily added to the evaluation function 36'''.

Signal $\overline{EN}$ is connected to an input of NOR gate 104 via inverter gates 162 and 164. Should signal $\overline{EN}$ go high, the output of NOR gate 104 will go low and bilateral switch 102 will open to disconnect the remote protective relay signal $V_F'$ from the evaluation circuit. An SPDT switch 166 may be provided to manually select whether or not the signal $\overline{EN}$, when high, is to block all trips, or just the comparison trip. Signal $\overline{EN}$ is connected to the "block" terminal of switch 166, and its "unblock" terminal is not connected to the circuit. The switch actuator of switch 166 is connected to an input of NOR gate 106 via a diode 168. If switch 166 is in the "unblock" position illustrated in FIG. 7, only the local-remote comparison function of the relay will be affected by the high $\overline{EN}$ signal. If switch 166 is changed to the "block" terminal, a high disable signal $\overline{EN}$ will prevent NOR gate 106 from going high to initiate a true trip signal, regardless of the function which is attempting to provide a trip signal.

Signal $\overline{EN}$ is also connected to MV 116, which may be the same type of multivibrator as MV 139 or MV 145, via inverter gates 162 and 164 and NOR gate 114. When signal $\overline{EN}$ goes high, the Q output of MV 116 provides a logic one pulse of predetermined duration, such as 20 ms, which pulse is applied to an input of NOR gate 106 via diode 169 to block any trip during this period of time. Another multivibrator MV 170 is provided which is also responsive to signal $\overline{EN}$ via inverter gates 162 and 164. MV 170 applies a trip blocking pulse of predetermined duration, such as 20 ms, to an input of NOR gate 106 when signal $\overline{EN}$ goes from a logic one to a logic zero, to override system transients at the time the communication channel returns to normal.

As described in incorporated co-pending application Ser. No. 339,031, the output signal $V_{op} - V_R/G$ from the evaluation circuit 36' is compared with a preset pick-up or bias voltage provided by reference 130. When signal $V_{op} - V_R/G$ is less than the reference 130, signal $\overline{T}$ is high, indicating no fault in the protected transmission line section. When signal $V_{op} - V_R/G$ exceeds the reference, signal $\overline{T}$ will go low to indicate a fault in the protected line section. The demodulated noise in the communication channel, which is proportional to $V_x$, shows up as an addition to signal $V_{OP} - V_{R/G}$. The greater the noise the greater signal $V_{OP} - V_{R/G}$. If the trip reference is made proportionally incremental with the channel noise, the accuracy of the trip circuit can be maintained. If desired, an even greater proportion of $V_x$ may be used to modify the reference, to produce a desensitizing effect. Thus, the noise signal $V_X$ may be applied to one of the inputs of op amp 138, such as to the non-inverting input, via a summing resistor 172 and a bilateral switch 174.

Signal $\overline{EN}$ is connected to the control input of switch 174 via inverter gate 162. Thus, when the signal quality of the communication signal is good, $\overline{EN}$ is low and switch 174 is closed to connect the noise signal $V_X$ to the tripping comparator circuit 132. The noise signal $V_X$, being negative, is effectively subtracted from the signal $V_{op} - V_R/G$. The greater the channel noise, the higher the noise content in signal $V_{op} - V_R/G$. Thus, by adding a proper amount of $V_x$ to the trip reference 130, the accuracy of the trip can be maintained. This feature is entirely adaptive, providing a very desirable function which is otherwise difficult to obtain. If the signal quality is poor and signal $\overline{EN}$ goes high, switch 174 opens to remove the noise signal $V_X$ from the tripping comparator 132. Thus, overcurrent trips may be made without the sensitivity reduction introduced by the noise signal modification. If desired, the Q output of MV 116 may be connected to the control input of switch 174, to maintain switch 174 closed, and thus maintain the less sensitive mode for the period of the blocking pulse, to override any system transients during this transition period.

In summary, there has been disclosed a new and improved protective relay system including signal quality monitoring apparatus suitable for monitoring communication signals used in such relay systems. The signal quality monitor apparatus utilizes both AC and DC signals from the receiver agc stage to provide signal frequency, signal magnitude and S/N checks, with the failure of any parameter to satisfy predetermined minimum standards resulting in a disable signal at the output of the monitor. The disable signal is used in the protective relay system to discontinue at least those protective relay functions dependent upon the sub-standard communication signal. Further, a signal representative of channel noise, developed for the S/N monitoring function, is used in the trip circuits to discount the noise present in the signal $V_{OP}-V_{R/G}$. In other words, the comparison signal, which initiates tripping of the associated circuit breaker when it reaches a predetermined reference level, is reduced by the amount of the noise contained in signal $V_{OP}-V_{R/G}$.

We claim as our invention:

1. A protective relay system for providing protection for an alternating current transmission line section having at least first and second terminals for providing first and second protective relay signals, respectively, and including associated circuit breakers at said first and second terminals, said system comprising:

automatic gain control (agc) amplifier means having a signal receiving input connected to receive the first protective relay signal, a gain control input, and an output;

gain control means providing a unidirectional gain control signal for said gain control input, with the magnitude of said gain control signal being responsive to the output of said agc amplifier means, to maintain the output signal of said agc amplifier means substantially constant;

signal quality monitoring means including means for generating a first reference signal, first comparator means for comparing the magnitude of said gain control signal with said first reference signal to obtain an indication of whether or not the magnitude of the first protective relay signal is within a predetermined range, noise means responsive to the output of the agc amplifier means for providing a noise signal having a magnitude responsive to the noise in the first protective relay signal, a second comparator means for comparing the magnitudes of said noise and gain control signals to obtain an indication of the signal-to-noise ratio of the first protective relay signal, and means for providing a disable signal when the quality of the first protective relay signal is below a predetermined level;

means for comparing said first and second protective relay signals and for providing a comparison signal in response to said comparison;

means for generating a second reference signal;

trip means for comparing said comparison signal with said second reference signal and for providing a trip signal for the circuit breaker associated with the second terminal; and means responsive to said signal quality monitoring means for blocking a trip signal from tripping said associated circuit breaker when said signal quality monitoring means is providing said disable signal.

2. The protective relay system in accordance with claim 1 wherein the first and second terminals are remote and local terminals of said transmission line section.

3. The monitor of claim 1 including modification means for modifying one of the signals applied to the trip means with the noise signal.

4. The monitor of claim 3 wherein the disable signal, when provided, prevents the modification means from modifying the selected signal with the noise signal.

5. A protective relay system for providing protection for an alternating current transmission line section having at least first and second terminals, comprising:

first and second circuit interrupting means at the first and second terminals, respectively, to be protectively controlled, means at the first and second terminals for providing first and second protective relay signals, respectively, communication means including first transmitter means, a first communication channel, and a first receiver, for communicating the first protective relay signal from the first to the second terminal, and second transmitter means, a second communication channel, and second receiver means for communicating the second protective relay signal from the second to the first terminal, said second receiver means including automatic gain control (agc) amplifier means having a signal input responsive to said second protective relay signal, a gain control input, and a signal output, gain control means providing a unidirectional gain control signal for said gain control input, with said gain control signal being responsive to the signal at the output of said agc amplifier means, to maintain the signal at the output of the agc amplifier means substantially constant, signal quality monitoring means responsive to both the gain control signal and the signal at the output of said agc amplifier means for providing a disable signal when a predetermined parameter of said signals indicates the quality of the second protective relay signal is below a predetermined standard, trip means at the first terminal for comparing the first and second protective relay signals, and for providing a trip signal for the first circuit interrupter means when said comparison indicates a fault in the protected line section, and means responsive to the signal quality monitoring means for preventing the trip signal from the trip means from tripping said first circuit interrupter means when the signal quality monitoring means is providing said disable signal.

6. The protective relay system of claim 5 including means responsive to said disable signal for continuing to block the trip signal from tripping the first circuit interrupter means for a predetermined period of time following the cessation of the disable signal.

7. The protective relay system of claim 5 wherein the signal quality monitoring means includes magnitude limit means responsive to the gain control signal, and frequency limit means responsive to the signal at the output of the agc amplifier means.

8. The protective relay system of claim 7 wherein the magnitude limit means includes means for establishing both upper and lower magnitude limits, and the frequency limit includes means for establishing both upper and lower frequency limits.

9. The protective relay system of claim 8 wherein the signal quality monitoring means additionally includes noise means responsive to the output of the agc amplifier means for providing a noise signal, and wherein the signal quality monitoring means compares the gain control signal and noise signal to obtain an indication of the signal-to-noise ratio.

10. The protective relay system of claim 8 wherein the frequency limit means includes means squaring the waveform of the output signal of the agc amplifier means, and the means for establishing the upper frequency limit includes first multivibrator means responsive to the squared waveform, and the means for establishing the lower frequency limit includes second multivibrator means responsive to an output of said first multivibrator means.

11. The protective relay system of claim 5 wherein the signal quality monitoring means includes means for providing a noise signal responsive to the noise in the signal at the output of the agc amplifier means, and signal-to-noise ratio means which compares the gain control output with said noise signal.

12. The protective relay system of claim 11 wherein the means for providing a noise signal includes filter means for passing a predetermined frequency band into the agc amplifier means, which band extends on both sides of the signal bandwidth of the second protective relay signal, means for rejecting a predetermined portion of said band passed signal, which predetermined portion includes the frequency band of the communication signal, with the resulting signal being used by the means which provides the noise signal.

13. The protective relay system of claim 11 wherein the trip means includes means providing a comparison signal responsive to the comparison of the first and second protective relay signals, reference means providing a reference signal, and comparator means for comparing said reference signal and said comparison signal, including modification means for modifying one of the signals applied to the comparator means with the noise signal.

14. The protective relay system of claim 13 wherein the disable signal, when provided, prevents the modification means from modifying the selected signal with the noise signal.

15. The protective relay system of claim 13 wherein the noise signal is effectively subtracted from the comparison signal.

16. A protective relay system for providing protection for an alternating current transmission line section having at least first and second terminals, comprising:
first and second circuit interrupting means at the first and second terminals, respectively, to be protectively controlled,
means at the first and second terminals for providing first and second protective relay signals, respectively,
communication means including first transmitter means, a first communication channel, and a first receiver, for communicating the first protective relay signal from the first to the second terminal, and second transmitter means, a second communication channel, and second receiver means for communicating the second protective relay signal from the second to the first terminal,
means at the first terminal for comparing the first and second protective relay signals, and for providing a comparison signal responsive to said comparison,
means at the first terminal for providing a reference signal,
trip means comparing said comparison signal with said reference signal,
means at the first terminal for providing a noise signal responsive to the noise level in the second protective relay signal,
and modification means for modifying one of the signals compared by said trip means with said noise signal, with said trip means providing a trip signal for the first circuit interrupting means when the comparison of said trip means indicates a fault in the protected line section.

17. The protective relay system of claim 16 including means at the first terminal for monitoring the quality of the second protective relay signal, and for providing a disable signal when the signal quality is below a predetermined standard, and including means responsive to said disable signal, when provided, for preventing the modification means from modifying the selected signal with the noise signal.

18. The protective relay system of claim 16 wherein the noise signal is effectively subtracted from the comparison signal.

* * * * *